March 25, 1969  T. WARD  3,434,704
HEATING UP FURNACES
Filed Dec. 11, 1967
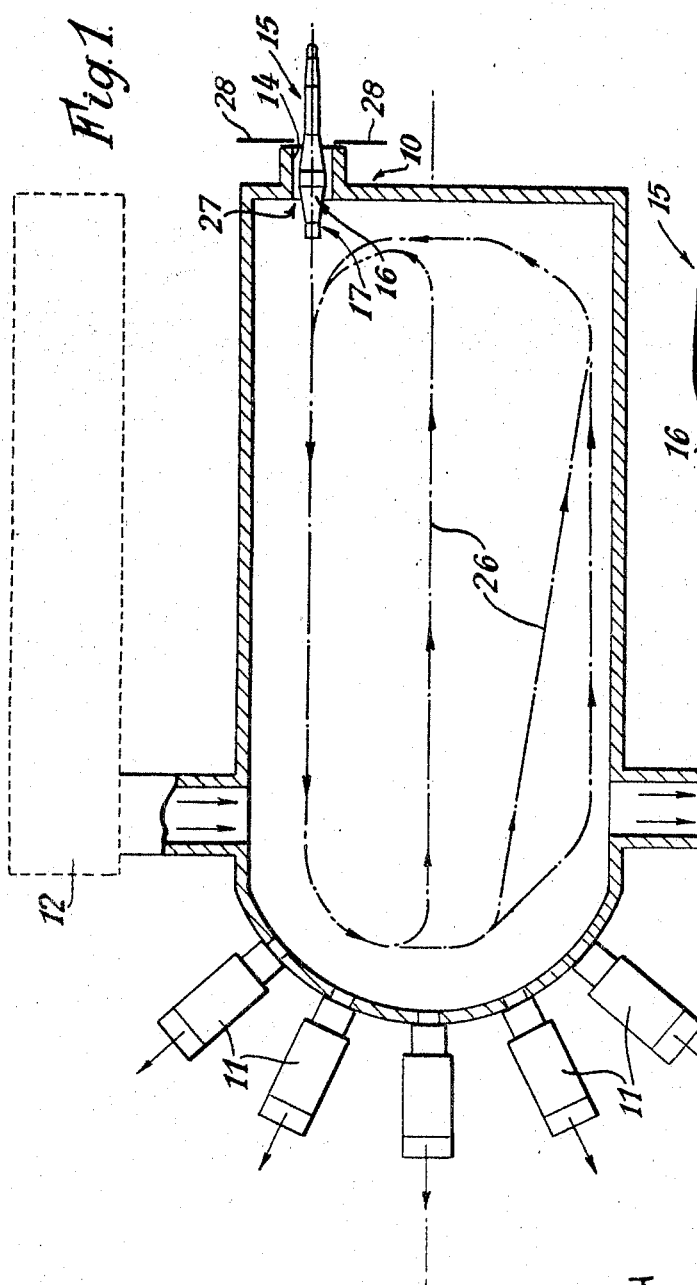
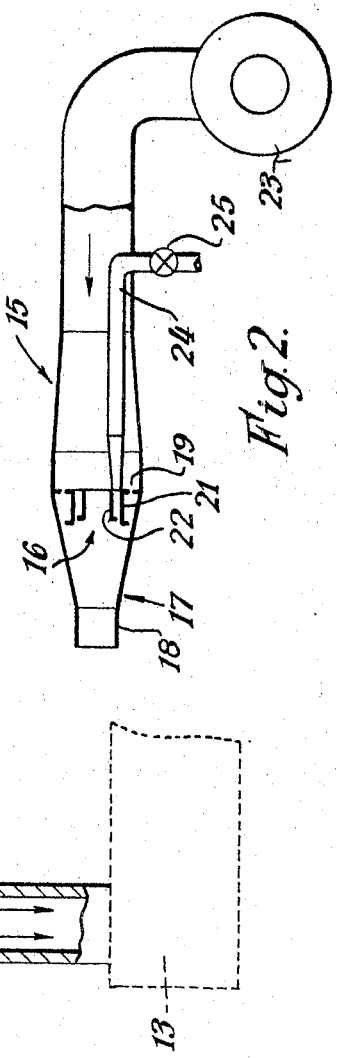
INVENTOR
TREVOR WARD
BY Harris and Bayley
ATTORNEYS United States Patent Office 3,434,704
Patented Mar. 25, 1969

3,434,704
HEATING UP FURNACES
Trevor Ward, London, England, assignor to Hotwork Limited, London, England
Continuation-in-part of application Ser. No. 416,718, Dec. 8, 1964. This application Dec. 11, 1967, Ser. No. 689,672
Int. Cl. F27d 7/02
U.S. Cl. 263—43  5 Claims

ABSTRACT OF THE DISCLOSURE

Heating up furnaces from cold is performed by a burner delivering a high speed flow of combustion products into the furnace through an opening in the wall thereof so as to entrain and circulate with the furnace atmosphere. The high speed flow is produced by directing the combustion products through a convergent nozzle the opening of which into the furnace is free and unobstructed.

---

This is a continuation-in-part application based upon my copending prior application Ser. No. 416,718 filed Dec. 8, 1964, now abandoned.

This invention relates to the starting up of furnaces, in particular glass melting tanks, after having been shut down.

Raising the temperature of furnaces from cold to their normal operating temperatures has always been a problem in view of the risk of cracking and other damage to expensive refractory lining materials sensitive to thermal shock. This is more particularly so in the case of glass melting tanks which are of very large dimensions and consist mainly of refractory material. The initial heating must be carried out in such a way that the temperature of the refractory is raised evenly at a rate not more than 2° C.–3° C. per hour. Thus the starting up of a glass melting tank is a very protracted operation and entails considerable loss of remunerative output to the glass manufacturer after a furnace has been relined, so that any means which can be safely adopted to reduce the time required to raise the furnace to the glass melting temperature will constitute a valuable technical advance in the glass industry and in many other cases where large furnace equipment is involved.

The present invention is based on the discovery that the time taken for starting up from cold of a glass melting tank or other refractory lined furnace, can be greatly reduced with safety if the heating is carried out mainly, if not entirely, by currents of heated gases the temperature of which can be controlled so as to increase progressively, radiant heat being suppressed as far as possible.

According to the present invention, a method of heating up furnaces from cold comprises passing into the furnace a current of heated air or inert gas at a temperature initially above room temperature and at a high velocity such that it entrains, and induces circulation in the furnace of, the furnace atmosphere, so that the heat from the gas current is dispersed in the furnace atmosphere and the temperature of the said atmosphere is evenly and progressively increased.

To produce the gas current, fuel may be burned to heat air or inert gas in a tubular burner having a convergent mouth inserted in an opening in the furnace wall, diluent air being entrained with the products of combustion to provide a gas current having a mass flow greater than that of the products of combustion alone.

The temperature of the heated air or gas current may be controlled by varying the supply of diluent air. Alternatively, the fuel and combustion air may be mixed at the point of combustion of the burner, the temperature of the heated air or gas current being controlled by varying the quantity of fuel supplied to the burner.

In the drawing:
FIGURE 1 shows diagrammatically a glass melting tank and a burner for heating the said tank by the method according to the present invention; and
FIGURE 2 shows, on a larger scale, a preferred burner construction.

Referring to FIGURE 1, a glass melting tank 10 provided with feeders 11 and regenerators 12 and 13 has an opening 14 in the wall thereof through which a tubular burner 15 can be inserted as shown. The burner 15, which burns gaseous or other fuel has, as shown in FIGURE 2, a combustion zone 16 from which a convergent mouth 17 extends to a nozzle 18 opening directly into the furnace so that the flow of products of combustion from the combustion zone is completely free and unobstructed.

The burner shown in FIGURE 2, which forms the subject of the United States Patent No. 3,275,057 issued on Sept. 27, 1966, has, at the rear end of the combustion zone 16 a partition plate 19 from which extend forwardly two co-axial tubes 21 and 22 each having an out-turned flange at its forward end. Air is supplied by a blower 23 to the inner tube and to the annular space around the outer tube, and fuel gas is supplied through a conduit 24 to the annular space between the two tubes, the gas supply being controllable by means of a valve 25. The air and fuel gas mix at the forward ends of the tubes 21 and 22 and burn at that position, eddy currents which are formed at the emergence of the gas and air from the tubes producing a random mixing of the said air and gas which, regardless of the overall ratio of gas to air, produces in some parts of the combustion zone an optimum mixture for combustion and ensures the maintenance of combustion if the said overall ratio is altered.

The products of combustion form a high velocity stream, their velocity being augmented by the convergence of the burner mouth, and, the said stream, being unobstructed, maintains its velocity as it enters the tank and creates extensive disturbance of the atmosphere in the tank, causing currents such as are indicated by the chain-dotted lines 26 in FIGURE 1, in which currents the products of combustion are entrained and distributed evenly over the whole of the tank, thus producing even and progressive heating.

Clearance may be provided around the burner mouth in the opening 14, as shown at 27, to enable diluent air to be entrained and drawn into the furnace by the gas stream passing through the nozzle 17. In order that the quantity of diluent air can be varied the said clearance may be obstructed to a varying degree, for example by sliding shutters 28 (FIGURE 1), which may be notched at their adjacent edges to fit around the burner 15 when they are in close proximity one to the other. Thus the temperature of the gas stream fed into the tank may be varied either by varying the quantity of fuel to combustion air or by varying the quantity of diluent air entrained.

When a predetermined temperature is reached which, in the case of a gas melting tank may be about 900° C. ordinary firing may be started up, the tubular burner being shut off and removed.

In heating up a glass melting tank or other furnace by the method according to the invention the burner is placed with its mouth 16 in the opening 14 as shown in FIGURE 1, and is started up with a relatively low temperature flame. As the tank or furnace heats up, the flame temperature is progressively increased either by increasing the proportion of fuel to air burnt, or by reducing the proportion of diluent air. The high velocity of the stream of combustion products from the burner, due to the combined effects of supply under pressure of the combustion air, the expansion of the gases on combustion, and the covergence of the feed tube causes it to entrain the furnace atmosphere and produce in the furnace a complete disturbance of the atmosphere which causes the heat to be evenly and rapidly distributed. The furnace walls are protected from radiant heat by the fact that the burner flame is within the burner mouth 16, so that uneven heating due to different distances of different parts of the furnace wall from the burner and the inverse square law of variation of intensity of radiant heat with distance is avoided. Moreover, the hot gases supplied to the furnace are thorougly dispersed in, and caused to circulate with, the furnace atmosphere, so that the temperature of the whole of the furnace is raised gradually and evenly.

It will be understood that the products of combustion of the tuular burner can be diluted with an inert gas instead of with air if this is desirable to maintain an appropriate atmosphere in the furnace.

I claim:
1. A method of gradually and progressively heating to operating temperature a cold furnace having a tank lined with a refractory material, said method comprising the steps of generating a heated gaseous medium, directing a flow of the heated gaseous medium to a nozzle opening directly and unobstructedly into the tank of the furnace, accelerating said heated gaseous flow by gradually decreasing the cross-sectional area thereof in the nozzle prior to the entry of the flow into the tank to a velocity at which the gas flow entrains the tank atmosphere thereby causing a circulation thereof within the tank and a dispersion of the heat of the gaseous flow in the tank atmosphere, providing a free and unobstructed flow of said gas into the furnace, and directing into the tank a flow of a diluent gaseous medium simultaneously with the heated gaseous flow and adjacent to the heated flow at the point of entry thereof into the tank.

2. A furnace comprising a melting tank having a lining made of refractory material for receiving therein a mass to be melted, a burner for burning a fuel to generate gaseous heated products of combustion, a feed tube defining an unobstructed passage communicating with said burner and extending into the tank through an opening thereof for discharging a flow of said gaseous combustion products into the tank, said feed tube including a portion convergent toward the discharge end of the tube and opening directly into said tank, said convergent tube portion increasing the velocity of said heated flow before being discharged into the tank to a pre-determined velocity at which the heated flow entrains the atmosphere within the tank to cause a circulation thereof and a dispersion of the heat of the gaseous flow in the tank atmosphere, and feed means for simultaneously directing a non-combustible second gaseous flow into the tank through said tank opening thereby increasing the momentum of the total flow entering the tank.

3. A furnace according to claim 2 wherein said feed tube is substantially centered in said opening with clearance therein, and said feed means direct said second flow into the tank around said centered tube.

4. A furnace according to claim 2 wherein the burner comprises a combustion zone, said convergent portion of said feed tube leading from said combustion zone into the tank, air supply means for feeding air to said combustion zone, blower means in said air supply means, fuel gas supply means for feeding fuel gas to said combustion zone, and means for varying the rate of the fuel supply fed through said fuel supply means to vary the temperature of combustion in said burner.

5. A furnace according to claim 2 wherein said burner feed tube and said opening define between them a passage for a second gas flow to be entrained and carried into the furnace by the flow of gaseous combustion products through the burner and further comprising shutter means operable to vary the area of said passage and so vary the dilution by said second gas flow of the total gas flow into the furnace and the temperature of the said total gas flow.

References Cited

UNITED STATES PATENTS

| 1,812,563 | 6/1931 | Simpson. | |
| 2,333,531 | 11/1943 | Ferguson | 158—11 |
| 2,504,320 | 4/1950 | Gamble | 263—43 |

FOREIGN PATENTS

| 581,086 | 7/1933 | Germany. |

CHARLES J. MYHRE, *Primary Examiner.*

U.S. Cl. X.R.

263—52